United States Patent
Chen et al.

(10) Patent No.: US 10,404,411 B2
(45) Date of Patent: Sep. 3, 2019

(54) METHOD AND SYSTEM OF ADAPTIVE APPLICATION LAYER FEC FOR MPEG MEDIA TRANSPORT

(71) Applicant: MEDIATEK INC., Hsin-Chu (TW)

(72) Inventors: Lulin Chen, Elk Grove, CA (US); Shan Liu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/074,014

(22) PCT Filed: Feb. 17, 2017

(86) PCT No.: PCT/CN2017/073918
§ 371 (c)(1),
(2) Date: Jul. 30, 2018

(87) PCT Pub. No.: WO2017/140261
PCT Pub. Date: Aug. 24, 2017

(65) Prior Publication Data
US 2019/0044645 A1     Feb. 7, 2019

Related U.S. Application Data

(60) Provisional application No. 62/297,190, filed on Feb. 19, 2016.

(51) Int. Cl.
*H04L 1/00* (2006.01)
*H04L 29/06* (2006.01)

(52) U.S. Cl.
CPC ............ *H04L 1/007* (2013.01); *H04L 1/0023* (2013.01); *H04L 1/0041* (2013.01); CPC .. *H04L 1/0045* (2013.01); *H04L 1/0061* (2013.01); *H04L 1/0083* (2013.01); *H04L 65/607* (2013.01); *H04L 69/22* (2013.01)

(58) Field of Classification Search
None
See application file for complete search history.

(56) References Cited

U.S. PATENT DOCUMENTS

| 2013/0136193 A1* | 5/2013 | Hwang | ................. H03M 13/05 375/240.27 |
| 2016/0182188 A1* | 6/2016 | Hwang | ................. H03M 13/27 375/240.27 |
| 2018/0069654 A1* | 3/2018 | Xu | ........................ H04L 1/0057 |

FOREIGN PATENT DOCUMENTS

| CN | 101686106 A | 3/2010 |
| CN | 102469311 A | 5/2012 |
| WO | 2015/060653 A1 | 4/2015 |

OTHER PUBLICATIONS

International Search Report dated May 10, 2017, issued in application No. PCT/CN2017/073918.

* cited by examiner

*Primary Examiner* — Xiaolan Xu
(74) *Attorney, Agent, or Firm* — McClure, Qualey & Rodack, LLP

(57) ABSTRACT

A method and system of AL-FEC using MMT protocol performed are disclosed. For an MMT receiving entity, a bounded FEC configuration setting is received from an MMT sending entity. The bounded FEC configuration setting belongs to an FEC configuration group consisting of at least one FEC configuration setting having a bounded-number of stages or layers of FEC coding structure, where the bounded-number is a positive integer greater than 1. If the bounded FEC configuration setting corresponds to one FEC configuration setting having the bounded-number of stages or layers of FEC coding structure, one or more FEC source packets and FEC repair packets are received from the MMT sending entity are FEC decoded into one recovered MMT packet using a range of FEC schemes having a target number of stages or layers of FEC coding structure from 1 to the bounded-number. The process for an MMT sending entity is also disclosed.

28 Claims, 5 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=0|C|FEC|r|X|R|RES|    type    |          packet_id           |
+-+-+-+-+-+-+-+-+-+-+-+-+-+-+-+-+-+-+-+-+-+-+-+-+-+-+-+-+-+-+-+-+
|                            timestamp                          |
+-+-+-+-+-+-+-+-+-+-+-+-+-+-+-+-+-+-+-+-+-+-+-+-+-+-+-+-+-+-+-+-+
|                     packet_sequence_number                    |
+-+-+-+-+-+-+-+-+-+-+-+-+-+-+-+-+-+-+-+-+-+-+-+-+-+-+-+-+-+-+-+-+
|                         packet_counter                        |
+-+-+-+-+-+-+-+-+-+-+-+-+-+-+-+-+-+-+-+-+-+-+-+-+-+-+-+-+-+-+-+-+
|                        header_extension                   ....
+-+-+-+-+-+-+-+-+-+-+-+-+-+-+-+-+-+-+-+-+-+-+-+-+-+-+-+-+-+-+-+-+
|                          payload data                     ....
+-+-+-+-+-+-+-+-+-+-+-+-+-+-+-+-+-+-+-+-+-+-+-+-+-+-+-+-+-+-+-+-+
|                       source_FEC_payload_ID               ....
+-+-+-+-+-+-+-+-+-+-+-+-+-+-+-+-+-+-+-+-+-+-+-+-+-+-+-+-+-+-+-+-+
```

Fig. 4

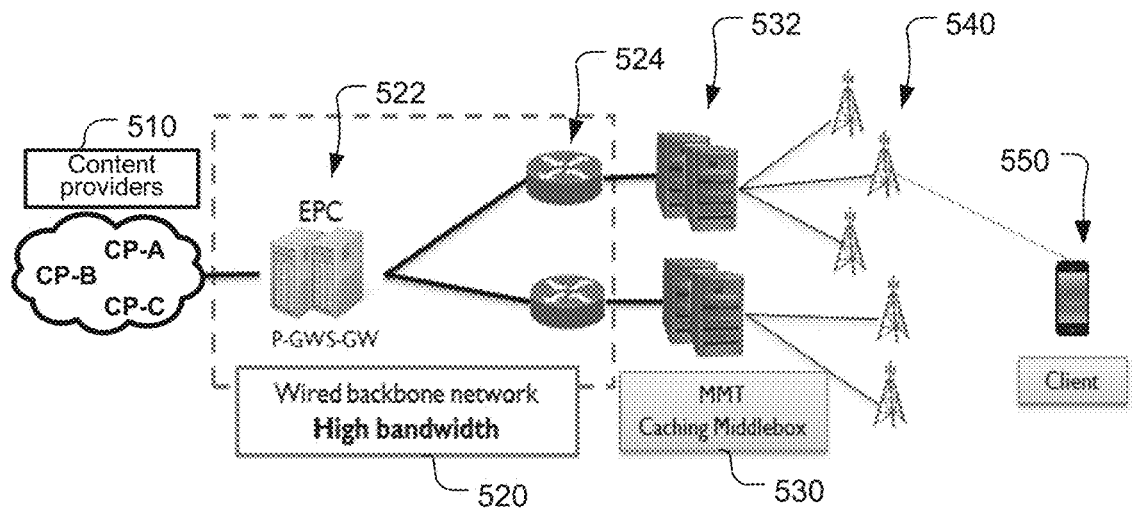

Fig. 5

METHOD AND SYSTEM OF ADAPTIVE APPLICATION LAYER FEC FOR MPEG MEDIA TRANSPORT

CROSS REFERENCE TO RELATED APPLICATIONS

The present invention claims priority to U.S. Provisional Patent Application, Ser. No. 62/297,190, filed on Feb. 19, 2016. The U.S. Provisional Patent Application is hereby incorporated by reference in its entirety.

TECHNICAL FIELD

The present invention relates to application-layer/level forward error correction (AL-FEC) for media transport over error-prone packet-based networks. In particular, the present invention relates to methods and systems to provide flexibility and adaptivity for AL-FEC for MPEG media transport (MMT) protocol.

BACKGROUND

The MPEG-H Part 1 (ISO/IEC 23008-1): MPEG Media Transport (MMT) ("*High efficiency coding and media delivery in heterogeneous environments—Part 1: MPEG media transport (MMT)*", ISO/IEC 23008-1, May 2014) is under development for its second edition (i.e., "*Draft text for ISO/IEC 23008-1 2nd edition*", N15518, June 2015, Warsaw, Poland). MMT is for the transport and delivery of coded media data for multimedia services over heterogeneous packet-switched networks. It provides an Application Layer/Level Forward Error Correction (AL-FEC) mechanism for reliable delivery in IP network environments.

FIG. 1 illustrates the architecture for application-layer/level forward error correction (AL-FEC) in MMT. MMT provides the application level forward error correction (FEC) mechanism for reliable delivery in IP network environments that are prone to packet losses. The MMTP layer 120 includes an MMT Protocol unit 122 and an MMT FEC Scheme unit 124. After packetization, MMT packets are passed to the MMT FEC scheme unit 124 for protection. The MMT FEC scheme unit 124 returns, as part of output, repair symbols and FEC payload IDs. Then, the output of unit 124 is delivered by MMT protocol unit 122 with the MMT packets. The FEC configuration information provides the identification of FEC encoded flow, and the information specified FEC coding structure and FEC code 126. It is delivered to an MMT receiving entity for FEC operation.

According to the standard, the MMT sending entity determines the Assets within packages which require protection and configures the FEC scheme. The MMT source packets and the FEC configuration information are passed to the MMT FEC scheme unit 124 for protection processing. The MMT FEC scheme unit 124 uses FEC code(s) 126 to generate repair symbols composing one or more FEC repair flows. They are passed to MMT protocol unit 122 along with source symbols and FEC payload IDs. Then MMT protocol unit 122 delivers the source and repair packets to the MMT receiving entity. At the MMT receiving entity, MMT protocol unit 122 passes the source flow and its associated FEC repair flow(s) in packet to MMT FEC scheme unit 124. Then the MMT FEC scheme unit 124 returns recovered MMT source packets.

Two FEC coding structures are specified in the standard as shown in FIG. 2 and FIG. 3 for the AL-FEC mechanism, i.e. the two-stage FEC coding structure and the Layer-Aware FEC (LA-FEC) coding structure. MMT Protocol (MMTP) enables to deliver streaming support data with AL-FEC repair data and signalling messages.

In the two-stage coding scheme as shown in FIG. 2, a source packet block (210) including a predetermined number of source packets is split into first M (M is an integer equal to or larger than 2) source packet sub-blocks (220, 222 through 224), which are used to generate first M source symbol sub-blocks (230, 232 through 234) from the first M source packet sub-blocks and to generate first encoding symbol blocks including the first M source symbol sub-blocks (250, 252 through 254) and first M repair symbol blocks (251, 253 through 255) using a first FEC encoder (240). The MMT FEC scheme then generates a second encoding symbol block including a second repair symbol block (256) generated by a second FEC encoder (242) from the first M source symbol sub-blocks (230, 232 through 234) as a second source symbol block.

FIG. 3 illustrates a method of generating a source symbol block for layered media data with two-layers according to AL-FEC coding structure of the standard. As shown in FIG. 3, Base Representation (BR) of a base layer is data that can be decoded independently in a media codec, whereas Enhancement Representation (ER) of an enhancement layer is data dependent on the BR. The data associated with the ER are shown in blocks filled with dots. On the other hand, the data associated with BR are shown in white blocks. As shown in FIG. 3, the base layer MMT packets (310) are converted to base layer source symbol sub-blocks (320). Also, the enhancement layer MMT packets (312) are converted to enhancement layer source symbol sub-blocks (322). Furthermore, BR is also used in generating repair symbol blocks for ER layer. Source symbol block 320 of the base layer is FEC coded for the base layer by itself and the combined source symbol block 330 including the both the source symbol blocks 320 of the base layer and the source symbol block 322 of the enhancement layer is FEC coded together for the enhancement layer.

In the current standard, AL-FEC messages and FEC fields in the MMT packet are used to signal an FEC scheme and usage. The structure of MMTP packet according to the standard is shown in FIG. 4. In FIG. 4, each row consists of 32 bits. Some relevant fields are described as follows. In the first row, "V" corresponds to Version number of the MMTP represented by 2 bits. This field shall be set to "00" to comply with this specification. "C" corresponds to packet_counter_flag represented by 1 bit. A "1" in this field indicates that the packet_counter field is present. "FEC" corresponds to FEC_type represented by 2 bits. "r" corresponds to "reserved" represented by 1 bit. "x" corresponds to extension_flag represented by 1 bit. "R" corresponds to RAP_flag (Random Access Point flag) represented by 1 bit. "RES" corresponds to "reserved" represented by 1 bit. "type" indicates the type of payload data represented by 6 bits. "packet_id" indicates the 16-bit packet ID. "packet_sequence_number" indicates the 32-bit packet sequence number. "timestamp" specifies the time instance of MMTP packet delivery based on UTC (Coordinated Universal Time) in 32 bits. "packet_counter" specifies the packet counter in 32 bits. "header_extension" is a field containing user-defined information.

The 2-bit codes for the FEC_type (i.e., FEC_type) field are listed in Table 1.

TABLE 1

| Value | Description |
| --- | --- |
| 0 | MMTP packet without Source FEC payload ID |
| 1 | MMTP packet with Source FEC payload ID |
| 2 | MMTP packet for repair symbol(s) for FEC Payload Mode 0 (FEC repair packet) |
| 3 | MMTP packet for repair symbol(s) for FEC Payload Mode 1 (FEC repair packet) |

The data type definition of data unit is shown in Table 2.

TABLE 2

| Value | Data type | Definition of data unit |
| --- | --- | --- |
| 0x00 | MPU | a media-aware fragment of the MPU |
| 0x01 | Generic object | a generic object such as a complete MPU or an object of another type |
| 0x02 | signalling message | one or more signalling messages or a fragment of a signalling message |
| 0x03 | repair symbol | a single complete repair symbol |
| 0x04~0x1F | reserved for ISO use | |
| 0x20~0x3F | reserved for private use | |

"source_FEC_payload_ID" (32 bits)—This field shall be used only when the value of FEC_type is set to '1'. MMTP packet with FEC_type=1 shall be used for AL-FEC protection for FEC Payload ID Mode 0 and this field shall be added to the MMTP packet after AL-FEC protection.

The AL-FEC messages are used to signal configuration information of an AL-FEC scheme to be used to protect Asset. In the message payload, those are the top level configuration information such as:
  fec_flag—indicates whether there is at least one source flow delivered with AL-FEC protection.
  private_fec_flag—indicates the presence of private FEC information.
  fec_coding_structure—indicates the applied AL-FEC coding structure for its associated FEC source flow. Valid values for this field are shown and described in Table 3 (i.e., Table C.5 in the standard).
  fec_payload_id_mode—indicates the applied FEC payload ID mode. Valid values are shown in Table 4 (i.e., Table AMD2 C.6 in the standard).

TABLE 3

| Value | Description |
| --- | --- |
| b0000 | AL-FEC is not applied |
| b0001 | One stage FEC coding structure |
| b0010 | Two stage FEC coding structure |
| b0011 | Layer-aware FEC coding structure |
| b0100~b1111 | reserved |

TABLE 4

| Value | Description |
| --- | --- |
| b0 | FEC payload ID mode 0 |
| b1 | FEC payload ID mode 1 |

The current CE (Core experiment) of Adaptive AL-FEC for MMT is to provide adaptive FEC protection in a more efficient way and to seek for a good strategy to implement adaptive and content-aware FEC protection for media data transport. Two aspects may be considered, i.e., channel characteristics and content priorities. Different FEC schemes or encoding matrices for channels may be used as there are many different kinds of channels with various characteristics. Differentiated or uneven FEC strength may be used for contents with various dependency and importance.

A third aspect may be considered that the delivery path may consist of multiple entities and may involve different network connections. According to the current ISO/IEC standard, when an AL-FEC configuration setting is selected for an end-to-end service, the source symbols will be FEC coded according to the AL-FEC configuration setting regardless of the characteristics of the networks. In heterogeneous network environment, the characteristics may be very different among various networks. Therefore, the uniform protection provided by the AL-FEC in the existing MMTP in a source content provider may not be suitable. It is desirable to develop a flexible and adaptive AL-FEC scheme for MMTP in which an entity in the delivery path may alter the protection within the range of AL-FEC scheme settings.

SUMMARY

A method and system of application layer-forward error correction (AL-FEC) using MPEG Media transport (MMT) protocol performed by an MMT receiving entity or an MMT middle box such as MANE (MMT aware network entity) are disclosed. According to one embodiment, a bounded FEC configuration setting is received from an MMT sending entity or another MMT middle box, where the bounded FEC configuration setting belongs to an FEC configuration group consisting of at least one FEC configuration setting having a bounded-number of stages or layers of FEC coding structure. The bounded-number is a positive integer greater than 1. If the bounded FEC configuration setting corresponds to one FEC configuration setting having the bounded-number of stages or layers of FEC coding structure, one or more FEC source packets and FEC repair packets are received from the MMT sending entity or said another MMT middle box, and decoding said one or more FEC source packets and FEC repair packets into one recovered MMT packet at the MMT receiving entity or the MMT middle box, and/or adding one FEC stage or layer to or deleting one FEC stage or layer from said one or more FEC source packets and FEC repair packets to generate one or more modified MMT packets at the MMT middle box using a range of FEC schemes having a target number of stages or layers of FEC coding structure from 1 to the bounded-number.

A method and system of application layer-forward error correction (AL-FEC) using MPEG Media transport (MMT) protocol performed by an MMT sending entity or an MMT middle box such as MANE are also disclosed. According to one embodiment, a bounded FEC configuration setting is signalled by an MMT sending entity or the bounded FEC configuration setting previously signalled is determined by the MMT middle box, where the bounded FEC configuration setting belongs to an FEC configuration group consisting of at least one FEC configuration setting having a bounded-number of stages or layers of FEC coding structure. The bounded-number is a positive integer greater than 1. If the bounded FEC configuration setting corresponds to one FEC configuration setting having the bounded-number of stages or layers of FEC coding structure, generating one or more FEC repair packets for one or more FEC source packets at the MMT sending entity or MMT middle box, and/or adding one FEC stage or layer to or deleting one FEC stage or layer from one or more previously received FEC source packets and FEC repair packets at the MMT middle box to generate one or more modified FEC repair packets for one or more FEC source packets using a range of FEC schemes having a target number of stages or layers of FEC coding structure from 1 to the bounded-number. Said one or more FEC source packets and said one or more FEC repair packets or said one or more modified FEC repair packets are sent to an MMT receiving entity or another MMT middle box.

The first FEC configuration setting may correspond to a two-stage or two-layer FEC coding structure and the second FEC configuration setting may correspond to a one-stage or one-layer FEC coding structure. The bounded FEC configuration setting can be signalled in an MMT protocol (MMTP) packet consisting of one AL-FEC message. Also, the bounded FEC configuration setting can be in effect until a next bounded FEC configuration setting is received.

The bounded FEC configuration setting can be signalled using AL-FEC message in an MMTP packet. Furthermore, FEC information of the FEC_type field in an MMTP packet can be used to signal the used FEC scheme related to a packet within the range of the bounded FEC configuration setting. The FEC information within the bounded FEC configuration setting can be signalled using a 2-bit FEC_type field in an MMTP packet header and packet type information contained in the FEC_type field becomes redundant for indicating a source packet or a repair packet when the packet type is declared in the 'type' field of MMT packet header as shown in Table 2 in this clause, where a first bit of the 2-bit FEC_type field can be used to indicate a number of stage or layer of FEC coding structure and a second bit can be used to indicate an FEC payload ID mode. For example, the first bit of the 2-bit FEC_type field equal to a first value indicates an MMTP packet with one-stage or one-layer FEC and the first bit of the 2-bit FEC_type field equal to a second value indicates the MMTP packet with two-stage or two-layer FEC. The second bit of the 2-bit FEC_type field equal to a first value indicates an MMTP packet with FEC payload ID mode 1 and the second bit of the 2-bit FEC_type field equal to a second value indicates the MMTP packet with FEC payload ID mode 0. In relation to this second bit of the 2-bit FEC_type field, the source_FEC_payload_ID field shall be added to an MMT protocol (MMTP) packet after AL-FEC protection only for FEC Payload Mode 0. The first value and the second value are two difference values selected from a group consisting of 0 and 1. Furthermore, the FEC payload ID mode information in the MMT protocol (MMTP) packet header becomes redundant for indicating the FEC payload ID mode when it can be set as the field of fec_payload_id_mode in AL-FEC message as in Table 4 and the second bit used to indicate an FEC payload ID mode can be reserved or used for indicating other information.

An FEC scheme within the bounded FEC configuration setting can be signalled using a 2-bit FEC_type field in an MMTP packet header to indicate a number of stages or layers of FEC coding structure, where the 2-bit FEC_type field equal to a first value indicates MMTP packet with one-stage or one-layer FEC, the 2-bit FEC_type field equal to a second value indicates MMTP packet with two-stage or two-layer FEC, the 2-bit FEC_type field equal to a third value indicates MMTP packet with three-stage or three-layer FEC, the 2-bit FEC_type field equal to a fourth value indicates a reserved value. In this case, a fec_coding_structure field in AL-FEC message carried as a payload in an MMT protocol (MMTP) packet can be used to indicate valid values for FEC coding structure, where the fec_coding_structure field equal to a first value indicates AL-FEC being not applied, the fec_coding_structure field equal to a second value indicates one-stage FEC coding structure, the fec_coding_structure field equal to a third value indicates two-stage FEC coding structure, the fec_coding_structure field equal to a fourth value indicates two-layer FEC coding structure, the fec_coding_structure field equal to a fifth value indicates three-stage FEC coding structure, the fec_coding_structure field equal to a sixth value indicates three-layer FEC coding structure, and the fec_coding_structure field equal to other values indicates reserved values.

BRIEF DESCRIPTION OF DRAWINGS

FIG. 4 illustrates the structure of MPEG Media Transport Protocol (MMTP) packet (V=0) as specified in the current ISO/IEC 23008-1standard.

FIG. 5 illustrates an example of services based on MPEG Media Transport (MMT) technology.

DETAILED DESCRIPTION

Figure 1:
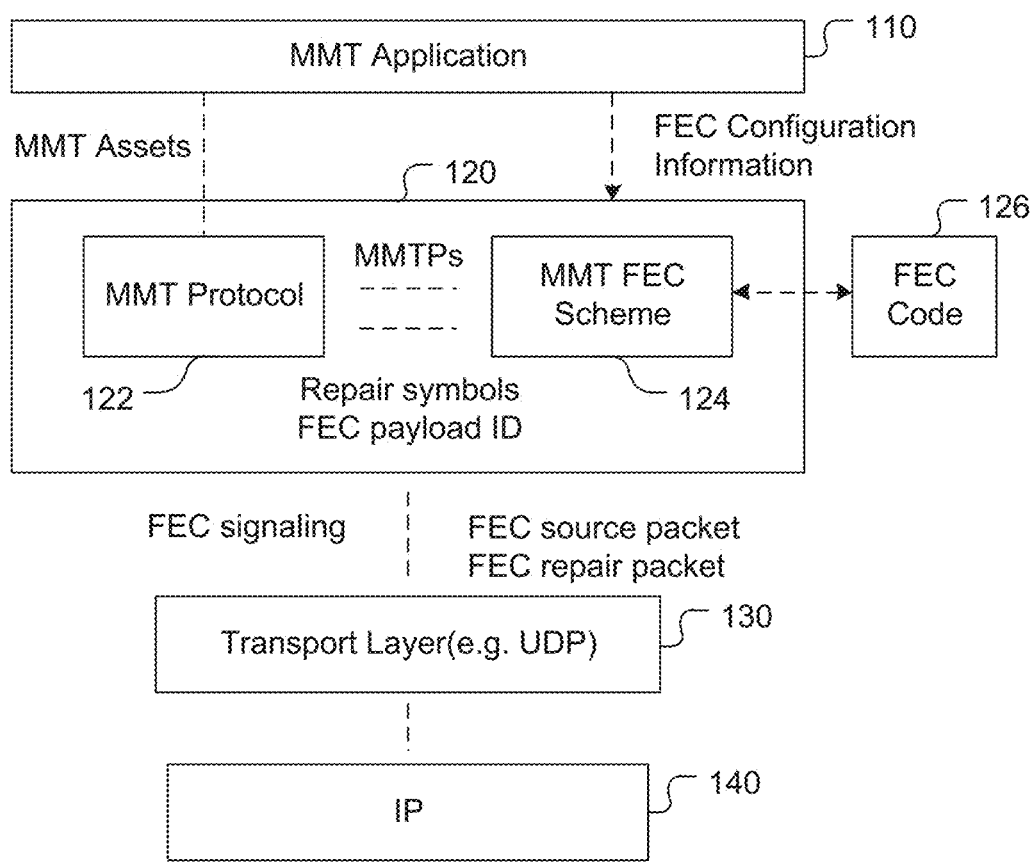
FIG. 1 illustrates the architecture for application-layer/level forward error correction (AL-FEC) used in MPEG media transport (MMT), the current ISO/IEC 23008-1 standard.
Figure 2:
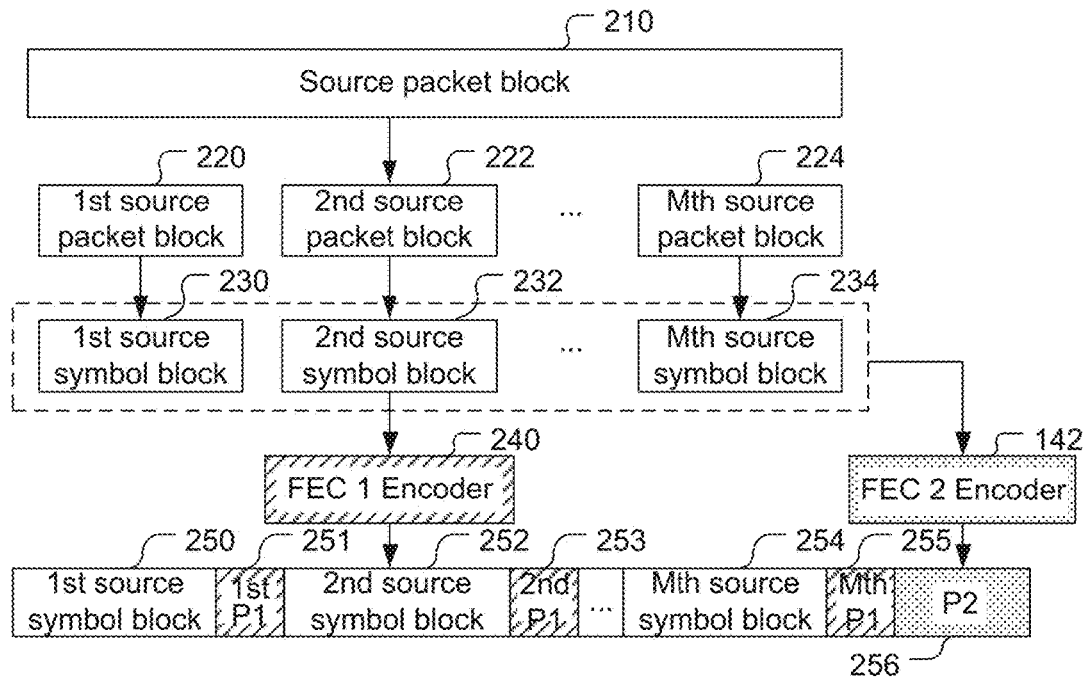
FIG. 2 illustrates the two-stage forward error correction (FEC) coding structure as specified in the current ISO/IEC 23008-1standard.
Figure 3:
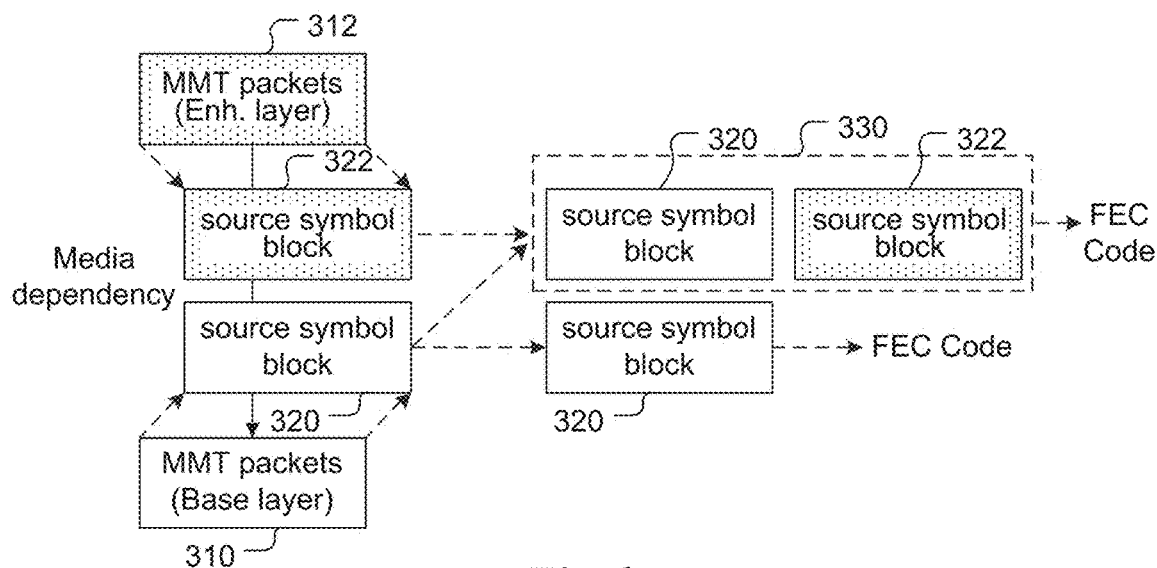
FIG. 3 illustrates the Layer-Aware FEC (LA-FEC) FEC coding structure as specified in the current ISO/IEC 23008-1standard.

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, when an application layer/level forward error correction (AL-FEC) configuration setting is selected, the source symbols will be FEC coded according to the AL-FEC configuration setting regardless of the characteristics of the networks according to the existing ISO/IEC 23008-1standard. Accordingly, techniques to provide flexible and adaptive AL-FEC are disclosed in the present invention.

The present invention addresses issues in the area related the existing FEC and differentiates the FEC information in MMTP packet with the AL-FEC message that is used for the FEC configuration. In general, the AL-FEC messages according to the present invention set a bounded configuration for an FEC scheme. The FEC configuration setting is in effect until a new AL-FEC message is issued. In other words, instead of a fixed configuration setting used by the existing ISO/IEC 23008-1standard, the signalled FEC configuration setting is treated as a "bound" for FEC configuration setting according to the present invention. Therefore, any FEC configuration setting within the "bounded" FEC configuration setting is allowed. For example, the "bounded" FEC configuration setting may correspond to a two-stage FEC scheme. According to the existing ISO/IEC 23008-1standard, the two-stage FEC scheme will be always used regardless the underlying network environment. However, according to the present invention, the two-stage FEC scheme is treated as a "bound" and the system will allow any configuration within the "bound". Accordingly, the system may also use one-stage FEC scheme or even turn off the FEC. A receiving entity according to the present invention can allocate resources, such as buffer sizes and FEC schemes in terms of the configuration for supporting the overall AL-FEC. The FEC information in MMTP packet header works for the given MMTP packet within ranges and types of the configuration by the AL-FEC message. The configuration setting selected for the packet allows FEC flexibility on a packet by packet basis. Such flexibility may be used by all sending and receiving entities through the delivery paths based on channel characteristics and personalized services. FIG. 5 illustrates an example of services with the MMT technology. There are several entities through the delivery path, where each of them can serve as a sending, and/or receiving entity and may be an MMT entity, such as "Content Providers" and "client", or MMT-aware network entity (MANE).

In FIG. 5, the configuration information and packet information from the first sending entity (i.e., Content Providers 510) to the last receiving entity (i.e., Client 550) pass the middle boxes (520 and 530) with possibility/opportunity of alterations, unless the connection is tunnelled from the first sending entity to the last receiving entity. The exemplary middle boxes in FIG. 5 include wired backbone network 520 with high bandwidth, which comprises Packet Data Network (PDN) Gateway (P-GW) or Service Gateway (S-GW) 522 and router/switch 524. The PDN GW is critical network function for the advanced mobile core network, known as the evolved packet core (EPC). In the cases of heterogeneous network and content delivery network (CDN) technologies, the possibility/opportunity of alterations may be used and controlled for a better overall service. In FIG. 5, MMT caching middlebox 530 is placed closer to the client end to improve service efficiency. The caching middlebox 530 usually comprises multiple servers 532 and they may be capable of performing some MMT functionalities. The cached and/or processed contents are then delivered through mobile network 540 to the client 550.

The FEC information in AL-FEC message and MMTP packet in the current standard may be summarized as follows. Table 5 lists the FEC features and relations based on the MMTP packet header and AL-FEC message.

In the present invention, the AL-FEC message is modified to support bounded configuration with the intention to cause minimum changes to the current standard. For example, the two-stage FEC scheme may be implemented as one-stage FEC or two-stage FEC by one entity, or may be cascaded and implemented by two or more (if more than two-stages) entities through the delivery path if needed. In another embodiment, the layer-aware FEC may be added as one-layer FEC or two-layer FEC by one entity, or may be cascaded and added by two or more (if more than two-layers) entities through the delivery path. Such flexibility is useful to tailor to the needed level of FEC protection based on network situations for service with MMT technologies. The initial sending entity may have the choice not to over protect the MMT Assets and the middle sending entity is able to add (or to remove) protection to the previous one as long as it is within the configuration types and ranges of the AL-FEC message. This invention makes the relevant changes and extensions as follows.

The FEC information in the MMTP packet is used to signal a packet related FEC scheme. In the MMTP packet, there are three fields that may be related to implementation of various embodiments of the present invention. These three fields are FEC_type, data type (as shown in Table 1 and Table 2), and source_FEC_payload_ID which is also related to FEC Payload Mode. For example, the FEC_type field for the existing standard as shown in Table 1 can be changed as below with two reserved values as shown in Table 6.

TABLE 6

| Value | Description |
| --- | --- |
| 0 | MMTP packet with FEC Payload ID Mode 1 |
| 1 | MMTP packet with FEC Payload ID Mode 0 |
| 2 | reserved |
| 3 | reserved |

The related change for description of the source_FEC_payload_ID field in an MMT packet is as follows:

"source_FEC_payload_ID" (32 bits)—This field shall be used only for FEC Payload ID Mode 0 and this field shall be added to the MMTP packet after AL-FEC protection.

Table 2 corresponding to the existing standard specifies the payload types including source packet type and repair packet type. Combining the revised FEC_type table (i.e., Table 6) and the data type in Table 3, MMT sending entity shall be able to signal the four cases in the original Table 1. In other words, for FEC Payload ID Mode 1, it signals the original case 0 (i.e., MMTP packet without Source FEC

TABLE 5

| AL-FEC | | |
| --- | --- | --- |
| AL-FEC not applied | AL-FEC applied | |
| fec_flag = 0 | fec_flag = 1 | |
| If every source flows are delivered without AL-FEC protection, all the remaining message is not be delivered. | FEC Payload ID mode 0 FEC_type = 1 (source packet) FEC_type = 2 (FEC repair packet) (Source FEC payload ID is added to the MMTP packet) | FEC Payload ID mode 1 FEC_type = 0 (source packet) FEC_type = 3 (FEC repair packet) (Source FEC payload ID is NOT added to the MMTP packet) |

For fec_coding_structure=0 in the AL-FEC message or FEC_type=0 in the MMTP packet header, this may also be used to indicate the absence of AL-FEC on a given flow.

Payload ID) and case 3 (i.e., MMTP packet for repair symbol(s)) for FEC Payload Mode 1 (i.e., FEC repair packet)) when type=0x00 and type=0x03, respectively. For FEC Payload ID Mode 0, it signals the original case 1 (i.e., MMTP packet with Source FEC Payload ID) and case 2 (i.e., MMTP packet for repair symbol(s) for FEC Payload Mode 0 (FEC repair packet)) when type=0x01 and type=0x02, respectively.

Furthermore, if the FEC Payload ID Mode is signalled in the AL-FEC message as in the table 4 corresponding to the existing standard (i.e., Table 4 in this disclosure), the field values as shown in Table 1 corresponding to original FEC_type may be revised with total four reserved values as in Table 7.

TABLE 7

| Value | Description |
| --- | --- |
| 0 | reserved |
| 1 | reserved |
| 2 | reserved |
| 3 | reserved |

These reserved bits of the FEC_type field in MMTP packet header may be used to signal a stage or a layer of FEC scheme by a sending entity. A receiving entity may choose to do further FEC processing as disclosed in the present invention, such as adding an additional stage or layer of FEC to the original one based on this field information and AL-FEC message. For example, 2 bits of FEC_type in the MMTP packet can be used separately for FEC_stage_or_layer (1 bit) and FEC_Payload_ID_Mode (1 bit). The first bit (FEC_stage_or_layer) is used to signal one or two-stage/layer FEC depending on the FEC coding structure (i.e., fec_coding_structure) in the AL-FEC message as shown in Table 8. The second bit (FEC Payload ID Mode) is used to signal FEC Payload ID Mode as shown in Table 9.

TABLE 8

| Value | Description |
| --- | --- |
| 0 | MMTP packet with one-stage or one-layer FEC |
| 1 | MMTP packet with two-stage or two-layer FEC |

TABLE 9

| Value | Description |
| --- | --- |
| 0 | MMTP packet with FEC Payload ID Mode 1 |
| 1 | MMTP packet with FEC Payload ID Mode 0 |

In another example, if FEC Payload ID Mode is specified in the AL-FEC message, the two bits of FEC_type may be used to signal the stage or layer, and other extended FEC scheme information depending on the FEC coding structure in the AL-FEC message as shown in Table 10.

TABLE 10

| Value | Description |
| --- | --- |
| 0 | MMTP packet with one-stage or one-layer FEC |
| 1 | MMTP packet with two-stage or two-layer FEC |
| 2 | MMTP packet with three-stage or three-layer FEC |
| 3 | Reserved |

Table 3 corresponding to Table C.5 in the existing standard may have additional valid values according to an embodiment of the present invention as shown in Table 11.

TABLE 11

| Value | Description |
| --- | --- |
| b0000 | AL-FEC is not applied |
| b0001 | One-stage FEC coding structure |
| b0010 | Two-stage FEC coding structure |
| b0011 | Two-layer FEC coding structure |
| b0100 | Three-stage FEC coding structure |
| b0101 | Three-layer FEC coding structure |
| b0110~b1111 | Reserved |

Figure 6:
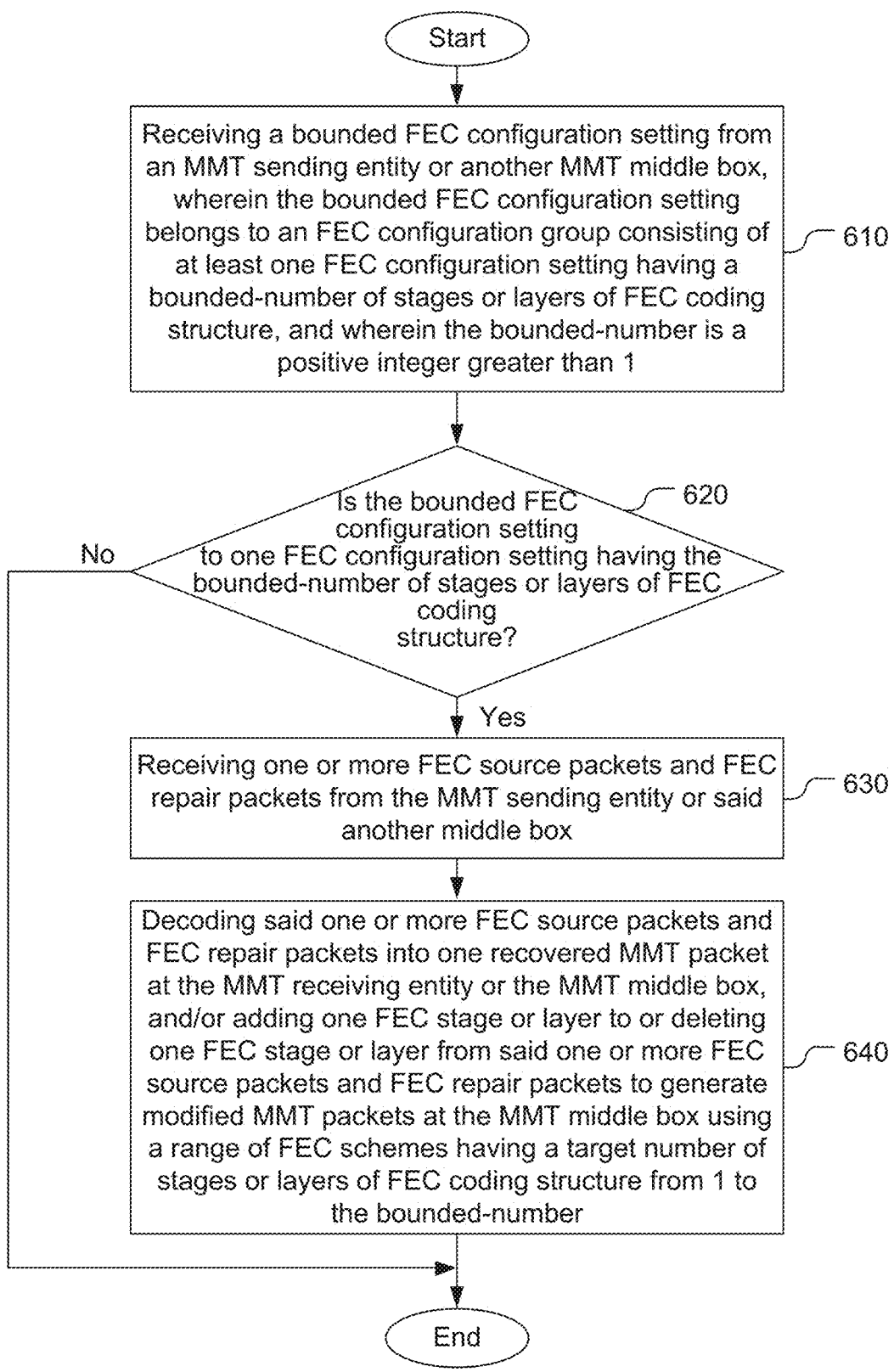
FIG. 6 illustrates an exemplary flowchart for an MPEG Media Transport (MMT) receiving entity incorporating application layer/level forward error correction (AL-FEC) using MMT protocol according to an embodiment of the present invention.

FIG. 6 illustrates an exemplary flowchart for an MPEG Media Transport (MMT) receiving entity or an MMT middle box incorporating application layer/level-forward error correction (AL-FEC) using MMT protocol according to an embodiment of the present invention. The steps shown in the flowchart may be implemented as program codes executable on one or more processors (e.g., one or more CPUs) at the server side and/or the client side. The steps shown in the flowchart may also be implemented based hardware such as one or more electronic devices or processors arranged to perform the steps in the flowchart. According to this method, a bounded FEC configuration setting is received from an MMT sending entity or another MMT middle box in step 610, where the bounded FEC configuration setting belongs to an FEC configuration group comprising at least one FEC configuration setting having a bounded-number of stages or layers of FEC coding structure. The bounded-number is a positive integer greater than 1. As mentioned previously, the FEC configuration setting may consist of a two-stage/two-layer FEC coding structure and a one-stage/one-layer FEC coding structure. In this case, the bounded-number corresponds to 2 (i.e., two-stage or two-layer). The FEC configuration group may also consist of a three-stage/three-layer two-stage, a two-stage/two-layer FEC coding structure and a one-stage/one-layer FEC coding structure. In this case, the bounded-number may correspond to 3 (i.e., three-stage or three-layer) or 2 (i.e., two-stage or two-layer). Whether the bounded FEC configuration setting corresponds to one FEC configuration setting having the bounded-number of stages or layers of FEC coding structure is checked in step 620. If the result is "yes", steps 630 and 640 are performed. Otherwise (i.e., the "no" path from step 620), steps 630 and 640 are skipped. In step 630, one or more FEC source packets and FEC repair packets are received from the MMT sending entity or said another MMT middle box. In step 640, said one or more FEC source packets and FEC repair packets are decoded into one recovered MMT packet at the MMT receiving entity or the MMT middle box, and/or one FEC stage or layer is added to or deleted from said one or more FEC source packets and FEC repair packets to generate one or more modified MMT packets at the MMT middle box using a range of FEC schemes having a target number of stages or layers of FEC coding structure from 1 to the bounded-number. As is known for FEC, when FEC decoding is applied to the FEC source packets and FEC repair packets, correctable errors in the received source packets will be corrected by the FEC decoding process. In other words, the FEC decoding process includes the error correction.

Figure 7:
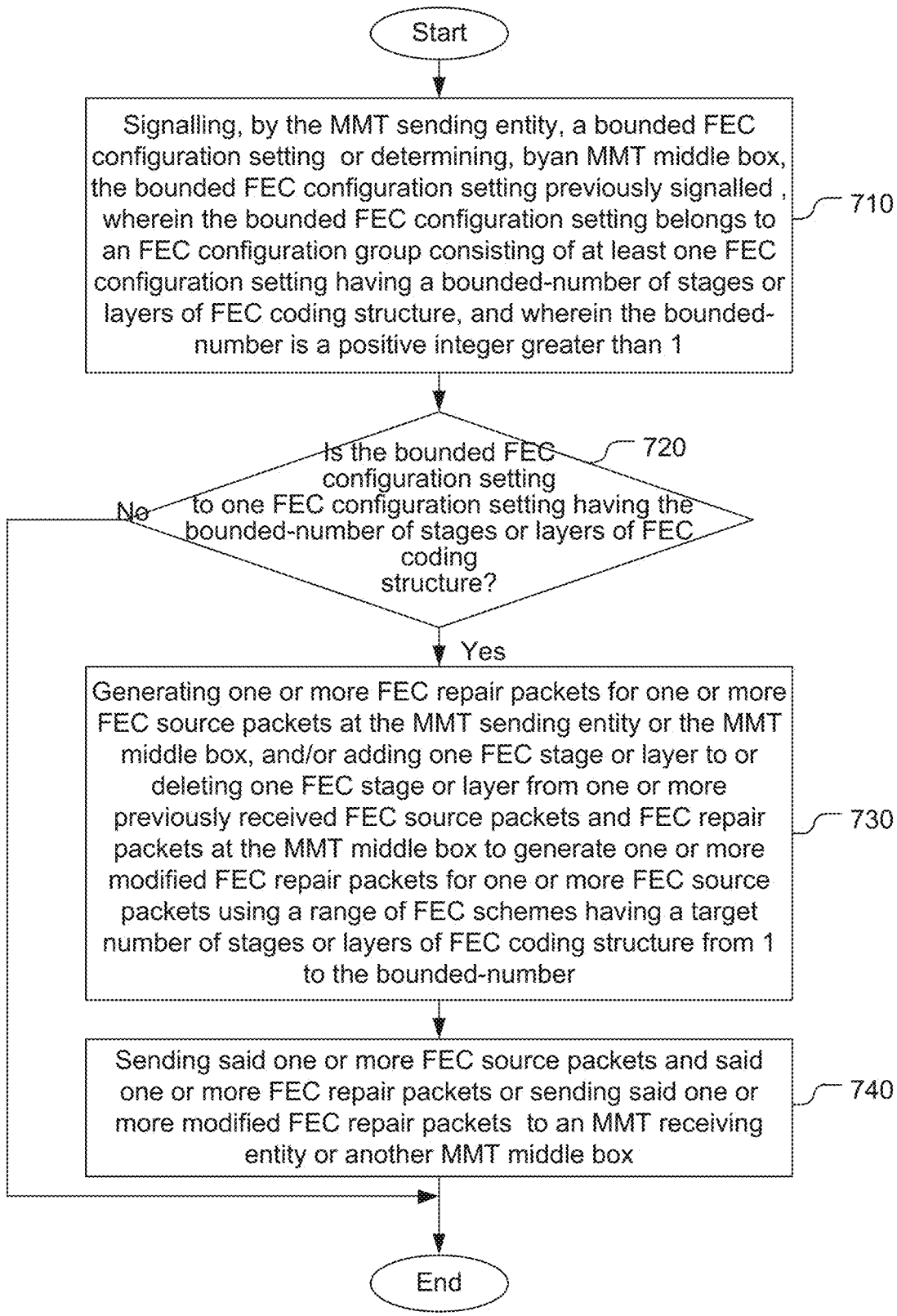
FIG. 7 illustrates an exemplary flowchart for an MPEG Media Transport (MMT) sending entity incorporating application layer/level forward error correction (AL-FEC) using MMT protocol according to an embodiment of the present invention.

FIG. 7 illustrates an exemplary flowchart for an MPEG Media Transport (MMT) sending entity incorporating application layer-forward error correction (AL-FEC) using MMT protocol according to an embodiment of the present invention. The steps shown in the flowchart may be implemented as program codes executable on one or more processors (e.g., one or more CPUs) at the server side and/or the client side. The steps shown in the flowchart may also be implemented based hardware such as one or more electronic devices or processors arranged to perform the steps in the flowchart. According to this method, a bounded FEC configuration setting is signalled by an MMT sending entity or the bounded FEC configuration setting previously signalled is determined by the MMT middle box in step 710, where the bounded FEC configuration setting belongs to an FEC configuration group comprising at least one FEC configuration setting having a bounded-number of stages or layers of FEC coding structure. The bounded-number is a positive integer greater than 1. As mentioned previously, the FEC configuration setting may consist of a two-stage/two-layer FEC coding structure and a one-stage/one-layer FEC coding structure. In this case, the bounded-number corresponds to 2 (i.e., two-stage or two-layer). The FEC configuration group may also consist of a three-stage/three-layer two-stage, a two-stage/two-layer FEC coding structure and a one-stage/one-layer FEC coding structure. In this case, the bounded-number may correspond to 3 (i.e., three-stage or three-layer) or 2 (i.e., two-stage or two-layer). Whether the bounded FEC configuration setting corresponds to one FEC configuration setting having the bounded-number of stages or layers of FEC coding structure is checked in step 720. If the result is "yes", steps 730 and 740 are performed. Otherwise (i.e., the "no" path from step 720), steps 730 and 740 are skipped. In step 730, one or more FEC repair packets are generated for one or more FEC source packets at the MMT sending entity or the MMT middle box, and/or one FEC stage or layer is added to or deleted from one or more previously received FEC source packets and FEC repair packets at the MMT middle box to generate said one or more modified FEC repair packets for one or more FEC source packets using a range of FEC schemes having a target number of stages or layers of FEC coding structure from 1 to the bounded-number. In step 740, said one or more FEC source packets and said one or more FEC repair packets or said one or more modified FEC repair packets are sent to an MMT receiving entity or another MMT middle box.

The flowcharts shown above are intended to illustrate examples of flexible and adaptive AL-FEC scheme incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of application layer-forward error correction (AL-FEC) using MPEG Media transport (MMT) protocol performed by an MMT receiving entity or an MMT middle box, the method comprising:

receiving a bounded FEC configuration setting from an MMT sending entity or another MMT middle box, wherein the bounded FEC configuration setting belongs to an FEC configuration group comprising at least one FEC configuration setting having a bounded-number of stages or layers of FEC coding structure, and wherein the bounded-number is a positive integer greater than 1; and if the bounded FEC configuration setting corresponds to one FEC configuration setting having the bounded-number of stages or layers of FEC coding structure:

receiving one or more FEC source packets and FEC repair packets from the MMT sending entity or said another MMT middle box; and decoding said one or more FEC source packets and FEC repair packets into one recovered MMT packet at the MMT receiving entity or the MMT middle box, and/or adding one FEC stage or layer to or deleting one FEC stage or layer from said one or more FEC source packets and FEC repair packets to generate one or more modified MMT packets at the MMT middle box using a range of FEC schemes having a target number of stages or layers of FEC coding structure from 1 to the bounded-number.

2. The method of claim 1, wherein the bounded-number corresponds to 2 or 3.

3. The method of claim 1, wherein the bounded FEC configuration setting is signalled in an MMT protocol (MMTP) packet comprising one AL-FEC message.

4. The method of claim 1, wherein the bounded FEC configuration setting is in effect until a next bounded FEC configuration setting is received.

5. The method of claim 1, wherein the bounded FEC configuration setting is signalled using AL-FEC message in an MMTP packet.

6. The method of claim 5, wherein FEC information in the MMTP packet is used to signal one FEC scheme related to a packet.

7. The method of claim 1, wherein FEC information within the bounded FEC configuration setting is signalled using a 2-bit FEC_type field in an MMTP packet header and packet type information contained in the FEC_type field is redundant for indicating a source packet or a repair packet, wherein a first bit of the 2-bit FEC_type field is used to indicate a number of stages or layers of FEC coding structure and a second bit is used to indicate an FEC payload ID mode.

8. The method of claim 7, wherein the first bit of the 2-bit FEC_type field equal to a first value indicates an MMTP packet with one-stage or one-layer FEC and the first bit of the 2-bit FEC_type field equal to a second value indicates the MMTP packet with two-stage or two-layer FEC, wherein the first value and the second value are two difference values selected from a group consisting of 0 and 1.

9. The method of claim 7, wherein the second bit of the 2-bit FEC_type field equal to a first value indicates an MMTP packet with FEC payload ID mode 1 and the second bit of the 2-bit FEC_type field equal to a second value indicates the MMTP packet with FEC payload ID mode 0, wherein the first value and the second value are two difference values selected from a group consisting of 0 and 1.

10. The method of claim 7, wherein FEC payload ID mode information in the FEC_type field of an MMT protocol (MMTP) packet header is redundant for indicating the FEC payload ID mode and a second bit used to indicate an FEC payload ID mode is reserved or used for indicating other information.

11. The method of claim 7, wherein one bit of FEC_type for indicating an FEC Payload Mode, source_FEC_payload_ID field is used and added to an MMT protocol (MMTP) packet after AL-FEC protection only for FEC Payload Mode 0.

12. The method of claim 1, wherein an FEC scheme within the bounded FEC configuration setting is signalled using a 2-bit FEC_type field in an MMTP packet header to indicate a number of stages or layers of FEC coding structure, wherein the 2-bit FEC_type field equal to a first value indicates MMTP packet with one-stage or one-layer FEC, the 2-bit FEC_type field equal to a second value indicates MMTP packet with two-stage or two-layer FEC, the 2-bit FEC_type field equal to a third value indicates MMTP packet with three-stage or three-layer FEC, the 2-bit FEC_type field equal to a fourth value indicates a reserved value.

13. The method of claim 12, wherein a fec_coding_structure field in one AL-FEC message carried as a payload in an MMT protocol (MMTP) packet is used to indicate valid values for FEC coding structure, wherein the fec_coding_structure field equal to a first value indicates AL-FEC being not applied, the fec_coding_structure field equal to a second value indicates one-stage FEC coding structure, the fec_coding_structure field equal to a third value indicates two-stage FEC coding structure, the fec_coding_structure field equal to a fourth value indicates two-layer FEC coding structure, the fec_coding_structure field equal to a fifth value indicates three-stage FEC coding structure, the fec_coding_structure field equal to a sixth value indicates three-layer FEC coding structure, and the fec_coding_structure field equal to other values indicates reserved values.

14. An MPEG Media transport (MMT) receiving entity or an MMT middle box to perform application layer-forward error correction (AL-FEC) using MMT protocol (MMTP), the MMT receiving entity or an MMT middle box comprising an MMT FEC scheme unit and one or more processors, wherein the MMT FEC scheme unit and said one or more processors are configured to:

receive a bounded FEC configuration setting from an MMT sending entity or another MMT middle box, wherein the bounded FEC configuration setting belongs to an FEC configuration group comprising at least one FEC configuration setting having a bounded-number of stages or layers of FEC coding structure, and wherein the bounded-number is a positive integer greater than 1; and if the bounded FEC configuration setting corresponds to one FEC configuration setting having the bounded-number of stages or layers of FEC coding structure:

receive one or more FEC source packets and FEC repair packets from the MMT sending entity or said another MMT middle box; and decode said one or more FEC source packets and FEC repair packets into one recovered MMT packet at the MMT receiving entity or the MMT middle box, and/or adding one FEC stage or layer to or deleting one FEC stage or layer from said one or more FEC source packets and FEC repair packets to generate one or more modified MMT packets at the MMT middle box using a range of FEC schemes having a target number of stages or layers of FEC coding structure from 1 to the bounded-number.

15. A method of application layer-forward error correction (AL-FEC) using MPEG Media transport (MMT) protocol performed by an MMT sending entity or an MMT middle box, the method comprising:

signalling, by the MMT sending entity, a bounded FEC configuration setting or determining, by the MMT middle box, the bounded FEC configuration setting previously signalled, wherein the bounded FEC configuration setting belongs to an FEC configuration group comprising at least one FEC configuration setting having a bounded-number of stages or layers of FEC coding structure, and wherein the bounded-number is a positive integer greater than 1; and if the bounded FEC configuration setting corresponds to one FEC configuration setting having the bounded-number of stages or layers of FEC coding structure:

generating one or more FEC repair packets for one or more FEC source packets at the MMT sending entity or the MMT middle box, and/or adding one FEC stage or layer to or deleting one FEC stage or layer from one or more previously received FEC source packets and FEC repair packets at the MMT middle box to generate one or more modified FEC repair packets for one or more FEC source packets using a range of FEC schemes having a target number of stages or layers of FEC coding structure from 1 to the bounded-number; and sending said one or more FEC source packets and said one or more FEC repair packets or sending said one or more modified FEC repair packets to an MMT receiving entity or another MMT middle box.

16. The method of claim 15, wherein the bounded-number corresponds to 2 or 3.

17. The method of claim 15, wherein the bounded FEC configuration setting is signalled in an MMT protocol (MMTP) packet comprising one AL-FEC message.

18. The method of claim 15, wherein the bounded FEC configuration setting is in effect until a next bounded FEC configuration setting is received.

19. The method of claim 15, wherein the bounded FEC configuration setting is signalled using AL-FEC message in an MMTP packet.

20. The method of claim 19, wherein FEC information in the MMTP packet is used to signal one FEC scheme related to a packet.

21. The method of claim 15, wherein FEC information within the bounded FEC configuration setting is signalled using a 2-bit FEC_type field in an MMTP packet header and packet type information contained in the FEC_type field is redundant for indicating a source packet or a repair packet, wherein a first bit of the 2-bit FEC_type field is used to indicate a number of stages or layers of FEC coding structure and a second bit is used to indicate an FEC payload ID mode.

22. The method of claim 21, wherein the first bit of the 2-bit FEC_type field equal to a first value indicates an MMTP packet with one-stage or one-layer FEC and the first bit of the 2-bit FEC_type field equal to a second value indicates the MMTP packet with two-stage or two-layer FEC, wherein the first value and the second value are two difference values selected from a group consisting of 0 and 1.

23. The method of claim 21, wherein the second bit of the 2-bit FEC_type field equal to a first value indicates an MMTP packet with FEC payload ID mode 1 and the second bit of the 2-bit FEC_type field equal to a second value indicates the MMTP packet with FEC payload ID mode 0, wherein the first value and the second value are two difference values selected from a group consisting of 0 and 1.

24. The method of claim 21, wherein FEC payload ID mode information in the FEC_type field of an MMT protocol (MMTP) packet header is redundant for indicating the FEC payload ID mode and a second bit used to indicate an FEC payload ID mode is reserved or used for indicating other information.

25. The method of claim 21, wherein one bit of FEC_type for indicating an FEC Payload Mode, source$_{13}$ FEC_payload_ID field is used and added to an MMT protocol (MMTP) packet after AL-FEC protection only for FEC Payload Mode 0.

26. The method of claim 15, an FEC scheme within wherein the bounded FEC configuration setting is signalled using a 2-bit FEC_type field in an MMTP packet header to indicate a number of stages or layers of FEC coding structure, wherein the 2-bit FEC_type field equal to a first value indicates MMTP packet with one-stage or one-layer FEC, the 2-bit FEC_type field equal to a second value indicates MMTP packet with two-stage or two-layer FEC, the 2-bit FEC_type field equal to a third value indicates MMTP packet with three-stage or three-layer FEC, the 2-bit FEC_type field equal to a fourth value indicates a reserved value.

27. The method of claim 26, wherein a fec_coding_structure field in one AL-FEC message carried as a payload in an MMT protocol (MMTP) packet is used to indicate valid values for FEC coding structure, wherein the fec_coding_structure field equal to a first value indicates AL-FEC being not applied, the fec_coding_structure field equal to a second value indicates one-stage FEC coding structure, the fec_coding_structure field equal to a third value indicates two-stage FEC coding structure, the fec_coding_structure field equal to a fourth value indicates two-layer FEC coding structure, the fec_coding_structure field equal to a fifth value indicates three-stage FEC coding structure, the fec_coding_structure field equal to a sixth value indicates three-layer FEC coding structure, and the fec_coding_structure field equal to other values indicates reserved values.

28. An MPEG Media transport (MMT) sending entity, or an MMT middle box to perform application layer-forward error correction (AL-FEC) using MMT protocol (MMTP), the MMT sending entity or an MMT middle box comprising an MMT FEC scheme unit and one or more processors, wherein the MMT FEC scheme unit and said one or more processors are configured to:
  signal, by the MMT sending entity, a bounded FEC configuration setting or determine, by the MMT middle box, the bounded FEC configuration setting previously signalled, wherein the bounded FEC configuration setting belongs to an FEC configuration group comprising at least one FEC configuration setting having a bounded-number of stages or layers of FEC coding structure, and wherein the bounded-number is a positive integer greater than 1; and
  if the bounded FEC configuration setting corresponds to one FEC configuration setting having the bounded-number of stages or layers of FEC coding structure:
  generate one or more FEC repair packets for one or more FEC source packets at the MMT sending entity or the MMT middle box, and/or adding one FEC stage or layer to or deleting one FEC stage or layer from one or more previously received FEC source packets and FEC repair packets at the MMT middle box to generate one or more modified FEC repair packets for one or more FEC source packets using a range of FEC schemes having a target number of stages or layers of FEC coding structure from 1 to the bounded-number; and
  send said one or more FEC source packets and said one or more FEC repair packets or send said one or more modified FEC repair packets to an MMT receiving entity or another MMT middle box.

* * * * *